United States Patent [19]

Commarmot

[11] 3,744,636
[45] July 10, 1973

[54] DIALYSIS LIQUID MONITORING AND GENERATING ASSEMBLY

[75] Inventor: Roger Commarmot, Rhone, France

[73] Assignee: Rhone-Poulenc S.A., Paris, France

[22] Filed: Jan. 5, 1972

[21] Appl. No.: 215,602

[30] Foreign Application Priority Data
Jan. 6, 1971 France .............................. 7100247

[52] U.S. Cl. .............................. 210/180, 210/321
[51] Int. Cl. ............................................. B01d 31/00
[58] Field of Search ....................... 210/22, 180, 321

[56] References Cited
UNITED STATES PATENTS
3,441,136  4/1969  Serfass et al. .................... 210/321 X Primary Examiner—Frank A. Spear, Jr.
Attorney—Stevens, Davis, Miller and Mosher

[57] ABSTRACT

Apparatus for generating and controlling the supply of dialysis liquid to a haemodialyzer comprises sources of dialysis liquid concentrate and water and a metering vessel for each, a mixing tank and a storage tank interconnected by flexible pipelines with valves and pinching devices. A heating vessel is between the storage tank and the haemodialyzer and a gas-bubble line runs from the top of the heating vessel direct to the pump by-passing the dialyzer. A part of the system including a temporary storage buffer tank may be formed into a smaller circuit for sterilization purposes.

6 Claims, 1 Drawing Figure

PATENTED JUL 10 1973 3,744,636
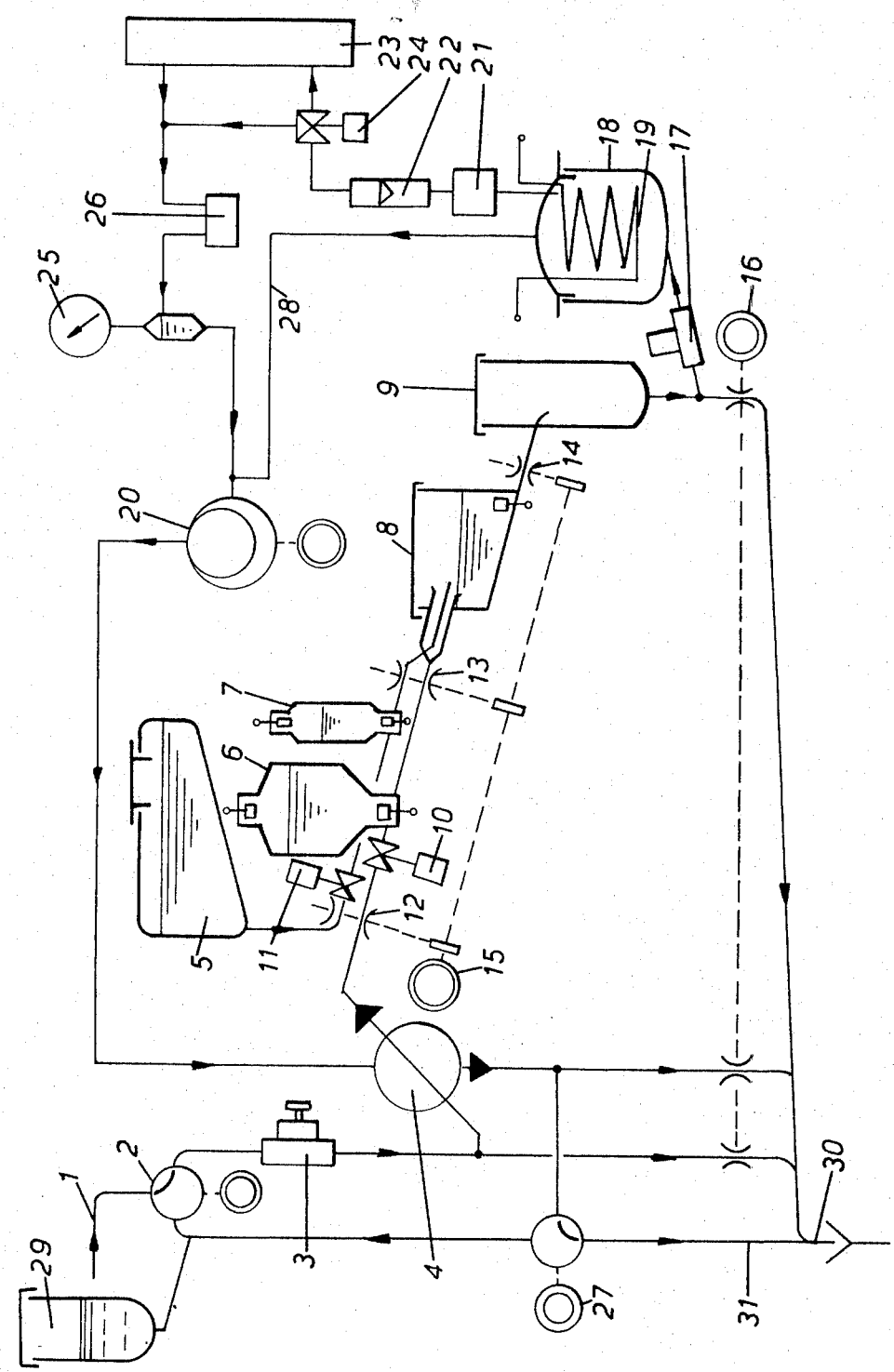

DIALYSIS LIQUID MONITORING AND GENERATING ASSEMBLY

The present invention relates to a dialysis liquid monitoring and generating assembly for supplying one or more apparatuses called haemodialyzers or "artificial kidneys", either in the home or in a hospital.

The operation of such assemblies must take place under conditions of extremely strict safety so as to preclude any accident which could be the result either of failure of the equipment or of faulty handling.

Moreover, it is important to be able conveniently and economically to sterilize the circuits of the dialysis bath whenever it has been utilized. The use of a sterilizing solution, for example based on formol or on Javelle water, requires extensive rinsing. The use of heat generally involves major consumption of energy.

According to the present invention, there is provided a dialysis liquid monitoring and generating assembly for supplying dialysis liquid to at least one haemodialyzer, said assembly comprising a vessel for metering water and a vessel for metering dialysis liquid concentrate, each of said vessels having means for detecting the levels of the respective liquid therein, a mixing tank, and a storage tank, flexible pipelines connecting the water metering vessel and the dialysis liquid concentrate metering vessel to a source of water and a source of dialysis liquid concentrate respectively, flexible pipelines connecting said two metering vessels to the mixing tank, and a flexible pipeline connecting said mixing tank to the storage tank, the relative positions of said vessels and said tanks being such that the liquids flow from the vessel to the mixing tank and thence to the storage tank by gravity, a valve between each of said metering vessels and its respective source, and means for simultaneously pinching both of said flexible pipelines at locations between said vessels and their respective sources, means for simultaneously pinching both of said flexible pipelines at locations between said vessels and the mixing tank, and means for pinching said pipeline between the mixing tank and the storage tank, said means for pinching the flexible pipelines being interconnected and actuated by a single motor.

Preferably the pipeline between the dialysis liquid concentrate metering vessel and the mixing tank is within the pipeline between the water metering vessel and the mixing tank at the point where they open into the mixing tank.

Preferably also, the assembly comprises a heating vessel for the dialysis liquid downstream of said storage tank, a haemodialyzer downstream of said heating vessel, and a suction pump downstream of said haemodialyzer, a pipeline being provided from the top of the heating vessel to the inlet to the suction pump bypassing the haemodialyzer.

Advantageously there is provided means to form at least part of the circuit including the heating vessel into a closed circuit whereby sterilization of that part of the circuit may be performed.

Preferably, this closed circuit includes a temporary storage tank. Suitably, the heating vessel can raise the temperature of the liquid in the closed circuit for sterilization to in the region of 90° to 100°C.

In order that the invention may be more fully understood, the following description is given, merely by way of example, reference being made to the accompanying drawing in which the sole FIGURE is a diagrammatic illustration of one embodiment of the invention.

The illustrated apparatus has a pipe 1 as a water supply which is connected to a source of mains water which may or may not be treated, a three-way tap, 2 an expansion chamber 3 and a heat exchanger 4 of a known kind, which enables part of the heat of the used dialysis liquid to be recovered.

A supply of dialysis liquid concentrate is provided in a reservoir 5 with a cover.

The outlet of the heat exchanger 4 is connected to a water metering vessel 6 and the outlet of the reservoir 5 is connected to a dialysis liquid concentrate metering vessel 7. Each of these metering vessels is equipped with high and low liquid level detectors. The respective capacities between the two levels of each of the two vessels are at a definite ratio to each other, this ratio being in the region of 33 to 1. These metering vessels are connected to the mixing tank 8 through the intermediary of pipelines, the ends of which are concentric at their ends in the mixing tank, the end of the pipe carrying the dialysis liquid concentrate being inside the end of the pipe in which the water flows. Preferably the mixing tank 8 is circular in cross-section and the pipe lines are tangential to the mixing tank 8. The latter communicates directly with a storage tank 9 for storing the dialysis liquid obtained in the mixer.

The flow of the fluids is preferably by gravity as far as the tank 9 the bottom of which is connected to a drain orifice via an electro-valve, that is, an electrically operated valve, 16. All these tanks communicate with the atmosphere via a filter in the top of each; they can thus drain completely. Electro-valves 10 and 11 are disposed upstream of each respective metering device 6 and 7. A selector 15 shuts off the various pipes in sequence: at 12, upstream of the two metering vessels, at 13, between the two metering vessels and the mixing tank, and at 14, between the mixing tank and the storage tank.

This selector 15 may, for example, comprise an electric motor which slowly rotates a shaft carrying a plurality of suitably keyed and profiled cams for alternately pinching and releasing the pipes at 12, 13 and 14, where these pipes consist of flexible tube sections, e.g. of silicon elastomers. These cams pinch the pipelines against fixed supports, and free, either a single pipeline as at 14 or two pipelines simultaneously as at 12 or at 13. Thus opening or closing of the pipelines at various points in the circuit in accord with a cyclic programme is ensured, the programme being strictly determined by a common mechanical means, whereby any error of manipulation or operating out of order is precluded.

At the exit from the storage tank 9 the dialysis liquid passes through a low pressure regulating device 17. This device may consist of a membrane in equilibrium between the reduced pressure of the dialysis liquid downstream of the regulator and the traction exerted by an opposing spring; the position of the membrane determines the opening of an orifice through which the dialysis liquid flows.

The dialysis liquid then enters the heating vessel 18, in which there is some heating means such as a coil 19 which is connected to a source of heat (not shown) and through which a suitable heating fluid flows, thus enabling the dialysis liquid to be brought to the desired temperature and to maintain this temperature by means of a control device.

The dialysis liquid is drawn from the heating vessel by a volumetric pump 20 of known kind, the output of which is virtually independent of the downstream pressure and of the reduced pressure upstream, e.g. a screw pump or a gear pump. The suction circuit connected to the haemodialyzer 23 comprises sequentially upstream of the haemodialyzer a conductivity meter 21, a performance meter 22, a three-way electro-valve 24 for by-passing the haemodialyzer, and downstream of the haemodialyzer, a colorimeter 26 and a low pressure manometer 25. A pipeline 28 directly connects the top of the heating vessel 18 to the suction of the pump 20 so as to remove the gases and vapors from the dialysis liquid prior to its passing through the haemodialyzer.

The return circuit of the pump 20 passes through the heat exchanger 4 and then divides. One branch of the circuit communicates with a drain opening 30. Opening or closing of this branch of the circuit is operated electrically by the drain valve 16. Another branch of the circuit may either also communicate via the line 31 with the drain opening 30 through the set of three-way electro-valves 27 and (2), each having two ports joined by an angled duct in a rotatable member regardless of the position of the drain valve 16, or be connected to the water supply circuit 1. In the latter case it forms a closed loop. This loop is connected to the bottom of a temporary storage tank 29 communicating with the atmosphere via a filter (not shown).

The apparatus which has been described operates as follows:

When the electro-valves 10 and 11 are open and while the selector 15 holds the pipelines open at 12 and closed at 13 and 14, the metering vessels 6 and 7 fill with water and with dialysis liquid concentrate respectively, up to the levels determined by the high level detectors.

When the high level detectors of the metering vessels 6 and 7 have been reached the electro-valves 10 and 11 close, and if the low level detector at the bottom of the mixing tank 8 simultaneously indicates that that tank is empty, the cam shaft of the selector 15 performs a fraction of a revolution such that the pipelines are first closed at 12 and then opened at 13. The piping is now kept closed at 14.

The doses of water and dialysis liquid concentrate now start to pour almost simultaneously into the mixing tank 8 although water still flows after the concentrate has ceased to flow. The pipelines connecting the metering vessels to the mixing tank preferably first run parallel and then concentric, the downstream end of the concentrate line being positioned interiorly of the downstream end of the water pipe. This arrangement allows the water to suck the concentrate and to entrain even the last drops of the latter. The doses of water and of concentrate do not flow at rates strictly proportional to their respective volumes, the mixture is homogeneous only in the mixing tank 8, where it makes up the store of dialysis liquid. When emptying is completed the low level regulators of the metering vessels 6 and 7 again actuate a fractional revolution of the cam shaft of the selector 15 which first closes the pipeline at 13 and then opens it at 12 and 14. The dialysis liquid flows from the mixing tank 8 into the storage tank 9. At the same time the electro-valves 10 and 11 open, thus enabling the metering vessels 6 and 7 to fill up for the next cycle.

The dialysis liquid is thus prepared in batches, the storage tank 9 storing the quantities of dialysis liquid required for continuous utilization.

The apparatus for preparing the dialysis bath which has been described could operate without the aid of a conductivity meter, the latter intervening merely as an auxiliary control element. In fact, the selector 15 mitigates possible failure of the electro-valves 10 and 11 should they become jammed fully or partially open. Moreover, the selector continually holds the pipelines alternately closed at 12, 13 or 14 so that short-circuiting, of any reservoir or metering vessel cannot occur. Furthermore, operation of the selector 15 cannot be effected unless the high or low level has actually been reached in accord with the prescribed programme, so that only full doses can be delivered and which are of strictly defined volume and concentration.

At the outlet of the storage tank 9, the dialysis liquid continuously passes through the reduced pressure regulator 17. The regulator maintains the reduced pressure of the dialysis bath at a substantially constant value despite the great variations in the supply pressure caused by the pump 20. For example an increase in flow of the dialysis liquid from 30 to 60 liters/hour, circulating under a reduced pressure of 350 mm Hg. relative to atmospheric pressure, results in a pressure drop variation of only 5.7 percent. Such a slight variation of pressure has an almost negligible effect on the dialysis.

The dialysis liquid enters the heating vessel 18 wherein its temperature is adjusted to the desired value. The gases formed while the dialysis liquid expands during passage through the reduced pressure regulator 17 and on contacting the coil 19 collect at the head of the heating vessel, from whence they are directly sucked off by the pump 20, via the line 28. A minimum and maximum thermometer provides an additional safeguard to the normal adjustment.

The degassed dialysis liquid passes through the haemodialyzer 23 as well as through various instruments which at any moment furnish the necessary indications of flow, pressure, conductivity as well as of the possible presence of blood escaping downstream of the haemodialyzer. Defective conductivity of the dialysis liquid actuates the electro-valve 24 which immediately short-circuits the haemodialyzer. Escape of blood released into the dialysis liquid brings about instantaneous stopping of the pump 20.

The dialysis liquid is generally continuously displaced by the volumetric pump 20 and the flow of the dialysis liquid is generally regulated by acting on the speed of the pump. The refluxed liquid passes through the heat exchanger 4 where it yields some of its heat to the water of the supply circuit. The dialysis liquid is next removed via the electro-valve 27 and the line 31, the drain valve 16 being closed.

The entire circuit of the dialysis liquid must be sterilized after use, and dried, so as to preclude microbial germs developing between consecutive utilizations. This can be done either by chemical means, such as by employing solutions based on formaldehyde, or thermally. In the latter case, the dialysis liquid is preferably directly used as sterilization bath. For reasons of economy and speed it is advantageous to recycle the sterilization bath which can here be done by virtue of the temporary storage tank 29. The operation of a sterilization cycle is as follows:

The concentrate reservoir 5 is isolated by the electro-valve 11, which is kept closed during the period of sterilizing; the haemodialyzer 23 circuit is short circuited by the electro-valve 24 and the dialysis liquid circuit is looped on itself by maneuvering the three-way electro-valves 2 and 27 while the drain valve 16, remains closed. The sterilization liquid consists of the dialysis liquid and the water which has remained in the system. It circulates in a closed circuit displaced by the pump 20; the level in the temporary storage tank 29 rises and falls alternately since the pump works continually and the vessels for preparing the doses operate in batches. One then proceeds as for preparing dialysis liquid, except in that the liquid temperature is brought to between 90° and 100°C. The circulation of the sterilizing liquid is kept up under these conditions for the time necessary to obtain a satisfactory degree of sterilization, for example 30 minutes.

The sterilization is stopped by stopping the source of heat, and opening the electro-valve 16, thus emptying all the liquid from the circuit. In this way the apparatus can be kept in good condition until the next time it is used. The sterilization of the apparatus is thus total, rapid and economic.

The circuit may be used to supply a number of artificial kidneys in parallel.

I claim:

1. A dialysis liquid monitoring and generating assembly for supplying dialysis liquid to at least one haemodialyzer, said assembly comprising a first flexible pipeline for connection to a source of water, a second flexible pipeline for connection to a source of dialysis liquid concentrate, a vessel fed by said first pipeline for metering said water, a vessel fed by said second pipeline for metering said dialysis liquid concentrate, means for detecting the levels of the liquids in each of said metering vessels, a mixing tank, a storage tank, third and fourth flexible pipelines respectively connecting said metering vessels to said mixing tank, and a fifth flexible pipeline connecting said mixing tank to said storage tank, said metering vessels, said mixing tank and said storage tank being arranged for gravitational flow of liquid from the metering vessel to the mixing tank and from the mixing tank to the storage tank, a valve for controlling liquid flow through each of said first and second flexible pipelines, pinching means for pinching each of said first and second flexible pipelines, pinching means for pinching each of said third and fourth flexible pipelines, means for pinching said fifth pipeline and a single motor connected with all said pinching means for simultaneously actuating said pinching means.

2. An assembly according to claim 1, further comprising a downstream end to each of said third and fourth flexible pipelines, each of said downstream ends being within the mixing tank, wherein the downstream end of said fourth flexible pipeline between the dialysis liquid concentrate metering vessel and the mixing tank is within said third flexible pipeline between the water metering vessel and the mixing tank.

3. An assembly according to claim 1, further comprising a heating vessel for the dialysis liquid, said heating vessel being arranged in the assembly downstream of said storage tank; a haemodialyzer downstream of said heating vessel; a suction pump downstream of said dialyzer, said suction pump having an inlet port; and a pipeline running from the top of said heating vessel to said inlet port of the suction pump, whereby gases formed in the heating vessel are removed from the dialysis liquid before the latter reaches the haemodialyzer.

4. An assembly according to claim 3 further comprising means for selectively bypassing the haemodialyzer to form at least part of the remainder of the circuit including the heating vessel into a closed circuit, whereby sterilization of that part of the circuit may be performed.

5. An assembly according to claim 4 wherein said closed circuit includes a temporary storage tank.

6. An assembly according to claim 4, wherein said heating vessel is operable to raise the temperature of the liquid in said closed circuit for sterilization to a temperature in the region of 90° to 100°C.

* * * * *